(12) United States Patent
Schmitt et al.

(10) Patent No.: US 12,731,826 B2
(45) Date of Patent: Sep. 8, 2026

(54) METHOD FOR PRODUCING A BATTERY MODULE AND BATTERY MODULE

(71) Applicant: Robert Bosch GmbH, Stuttgart (DE)

(72) Inventors: Markus Schmitt, Tamm (DE); Holger Knesch, Ludwigsburg (DE); Roman Marx, Moensheim (DE)

(73) Assignee: Robert Bosch GmbH, Stuttgart (DE)

( * ) Notice: Subject to any disclaimer, the term of this patent is extended or adjusted under 35 U.S.C. 154(b) by 849 days.

(21) Appl. No.: 17/860,727

(22) Filed: Jul. 8, 2022

(65) Prior Publication Data

US 2023/0018065 A1 Jan. 19, 2023

(30) Foreign Application Priority Data

Jul. 13, 2021 (DE) .......................... 10202107410.3

(51) Int. Cl.
*H01M 10/613* (2014.01)
*H01M 10/647* (2014.01)
(Continued)

(52) U.S. Cl.
CPC ....... *H01M 10/653* (2015.04); *H01M 10/613* (2015.04); *H01M 10/647* (2015.04); *H01M 10/6556* (2015.04); *H01M 50/209* (2021.01)

(58) Field of Classification Search
CPC ............ H01M 10/653; H01M 10/613; H01M 10/647; H01M 10/6556; H01M 50/209;
(Continued)

(56) References Cited

U.S. PATENT DOCUMENTS 10,186,697 B1 1/2019 Harris, III
2009/0239137 A1 9/2009 Kakuchi et al.
(Continued)

FOREIGN PATENT DOCUMENTS

DE 102011076580 A1 11/2012
DE 102012223566 A1 6/2014
(Continued)

OTHER PUBLICATIONS

Machine Translation DE 102015214185 (Year: 2021).*
(Continued)

*Primary Examiner* — George R Koch
*Assistant Examiner* — Christopher C Caillouet
(74) *Attorney, Agent, or Firm* — Michael Best & Friedrich LLP

(57) ABSTRACT

The invention relates to a method for producing a battery module having a plurality of prismatic battery cells (2, 20) which are arranged next to one another in a longitudinal direction (4) of the battery module (1) and in particular are additionally braced with one another, wherein the plurality of battery cells (2) are furthermore received in an interior (30) of a housing (3) of the battery module (1), wherein the plurality of battery cells (2, 20) are positioned in the housing (3) prior to the curing of an adhesive which is positioned in each case between a bottom surface (31) of the housing (3) of the battery module (1) and a bottom surface (21) of the battery cells (2), and in particular is fixed until the adhesive cures.

20 Claims, 7 Drawing Sheets

(51) Int. Cl.
*H01M 10/653* (2014.01)
*H01M 10/6556* (2014.01)
*H01M 50/209* (2021.01)

(58) Field of Classification Search
CPC ........... H01M 10/0525; H01M 50/293; H01M 10/0404; H01M 50/244; H01M 50/264; Y02E 60/10; Y02P 70/50
See application file for complete search history.

(56) References Cited

U.S. PATENT DOCUMENTS

| | | | |
|---|---|---|---|
| 2011/0027630 | A1 | 2/2011 | Tsutsumi et al. |
| 2011/0293973 | A1 | 12/2011 | Kim |
| 2013/0059190 | A1 | 3/2013 | Kossakovski et al. |
| 2014/0087231 | A1 | 3/2014 | Schaefer et al. |
| 2014/0266066 | A1 | 9/2014 | Turon Teixidor et al. |
| 2015/0037616 | A1 | 2/2015 | Wyatt et al. |
| 2016/0149180 | A1 | 5/2016 | Tokoo et al. |
| 2016/0301117 | A1* | 10/2016 | Tyler ................. H01M 10/0525 |
| 2017/0170510 | A1 | 6/2017 | Turon Teixidor et al. |
| 2018/0138563 | A1 | 5/2018 | Behm et al. |
| 2019/0044113 | A1 | 2/2019 | Wagner et al. |
| 2020/0112072 | A1 | 4/2020 | Schmitt |
| 2020/0127257 | A1 | 4/2020 | Lee et al. |
| 2020/0203784 | A1 | 6/2020 | Shimizu et al. |
| 2020/0388844 | A1 | 12/2020 | Richey |
| 2021/0005856 | A1 | 1/2021 | Norimine et al. |
| 2021/0226275 | A1 | 7/2021 | Enkirch et al. |
| 2021/0351454 | A1 | 11/2021 | Vizzini et al. |
| 2022/0093991 | A1 | 3/2022 | Cournoyer et al. |
| 2023/0018957 | A1 | 1/2023 | Schmitt et al. |
| 2023/0020447 | A1 | 1/2023 | Schmitt |
| 2023/0022636 | A1 | 1/2023 | Schmitt et al. |

FOREIGN PATENT DOCUMENTS

| | | | | |
|---|---|---|---|---|
| DE | 102013201021 | A1 | 7/2014 | |
| DE | 102014218330 | A1 | 3/2016 | |
| DE | 102015214185 | A1 | 2/2017 | |
| DE | 102015217630 | A1 | 3/2017 | |
| DE | 102017219556 | A1 | 5/2019 | |
| DE | 102018205896 | A1 | 10/2019 | |
| DE | 102019006234 | A1 | 3/2021 | |
| DE | 102019215006 | A1 | 4/2021 | |
| DE | 102019215636 | A1 | 4/2021 | |
| EP | 2324526 | A1 | 5/2011 | |
| EP | 2360768 | A1 | 8/2011 | |
| EP | 3694036 | A1 | 8/2020 | |
| EP | 3723156 | A1 * | 10/2020 | ............ H01M 50/20 |
| JP | H06188023 | A | 7/1994 | |
| JP | 2016085895 | A | 5/2016 | |
| JP | 2016204255 | A | 12/2016 | |
| KR | 100739841 | B1 | 7/2007 | |
| WO | 2014072119 | A1 | 5/2014 | |
| WO | WO-2019221376 | A1 * | 11/2019 | ............. B60L 50/64 |

OTHER PUBLICATIONS

Machine Translation WO 2019221376 (Year: 2019).*
Machine translation of DE10201521418 (Year: 2017).*
Non-final Office Action issued by the U.S. Patent Office for U.S. Appl. No. 17/861,294 dated Feb. 26, 2025 (19 pages).
Non-final Office Action issued by the U.S. Patent Office for U.S. Appl. No. 17/860,683 dated Mar. 11, 2025 (25 pages).
Non-final Office Action issued by the U.S. Patent Office for U.S. Appl. No. 17/861,295 dated Mar. 27, 2025 (29 pages).
Final Office Action issued by the U.S. Patent Office for U.S. Appl. No. 17/860,683 dated Aug. 12, 2025 (22 pages).
Final Office Action issued by the U.S. Patent Office for U.S. Appl. No. 17/861,294 dated Sep. 5, 2025 (24 pages).
Final Office Action issued by the U.S. Patent Office for U.S. Appl. No. 17/861,295 dated Oct. 2, 2025 (27 pages).
Non-final Office Action issued by the U.S. Patent Office for U.S. Appl. No. 17/861,295 dated Jan. 12, 2026 (30 pages).
Non-final Office Action issued by the U.S. Patent Office for U.S. Appl. No. 17/861,294 dated Nov. 7, 2025 (27 pages).
Non-final Office Action issued by the U.S. Patent Office for U.S. Appl. No. 17/860,683 dated Nov. 26, 2025 (24 pages).
Final Office Action issued by the U.S. Patent Office for U.S. Appl. No. 17/860,683 dated May 5, 2026 (15 pages).

* cited by examiner 1
11
3
5
11
6
8
6
8
4
2
5
12

METHOD FOR PRODUCING A BATTERY MODULE AND BATTERY MODULE

BACKGROUND OF THE INVENTION

The invention proceeds from a method for producing a battery module having a plurality of prismatic battery cells, in particular lithium-ion battery cells, which are arranged next to one another in a longitudinal direction of the battery module and in particular are additionally braced with one another, wherein the plurality of battery cells are furthermore received in an interior of a housing of the battery module. The present invention also relates to a battery module produced using such a method.

It is known from the prior art that a battery module has a plurality of individual battery cells which each have a positive voltage tap and a negative voltage tap, wherein, for the purpose of electrically conductively connecting the plurality of battery cells to one another in series and/or in parallel, the respective voltage taps are electrically conductively connected to one another and therefore can be interconnected to form the battery module. Battery modules, for their part, are further interconnected to form batteries or to form entire battery systems.

In particular, lithium-ion battery cells or lithium-polymer battery cells heat up as a result of chemical conversion processes in their interior, particularly in the case of rapid energy release or absorption in battery systems. The more powerful the battery system, the more it is heated up and consequently an efficient active thermal management system is required.

Temperature control is primarily in the form of liquid temperature control, for example using a water/glycol mixture. The temperature-control fluid is conducted, for example, through ducts in a cooling element arranged below the battery cells. In addition, these cooling elements are connected to a cooling circuit.

In addition, it is known from the prior art in this respect to remove heat from the battery cells via their cell bottoms, wherein the flow of heat passes through the bottom of the cell housing and a cooling plate into the cooling medium. Thermal contact-connection between the cell bottom and the cooling element is implemented by means of what is known as a thermal interface material (TIM), this possibly being, for example, a thermally conductive adhesive, what is known as a gap filler or what is known as a gap pad.

Prior art documents in this respect include, for example, EP 2 324 526 A1, EP 2 360 768 A1 or US 2014/266 066.

SUMMARY OF THE INVENTION

A method for producing a battery module according to the invention affords the advantage that, overall, reliable production of a battery module is provided, wherein in particular reliable positioning of a plurality of battery cells over the service life thereof is formed. In particular, the plurality of battery cells can be reliably positioned and fixed, during production, until an adhesive has cured to form an adhesive bond.

According to the invention, a method for producing a battery module having a plurality of prismatic battery cells, which are in the form of lithium-ion battery cells in particular, is provided for this purpose. Here, the battery cells are arranged next to one another in a longitudinal direction of the battery module. In addition, the battery cells are in particular braced with one another. Furthermore, the plurality of battery cells are received in an interior of a housing of the battery module. Prior to the curing of an adhesive which is arranged in each case between a bottom surface of the housing of the battery module and a bottom surface of the battery cells, the plurality of battery cells are positioned in the housing. In particular, the plurality of battery cells are fixed in the housing until the adhesive cures. Preferably, the adhesive comprises thermally conductive additives.

At this point, it should be noted that prismatic battery cells each comprise a battery cell housing with a total of six side surfaces, pairs of which are arranged opposite and substantially parallel to one another. Furthermore, side surfaces arranged adjacent to one another are arranged at a right angle to one another. The electrochemical components of the respective battery cell are received in an interior of the battery cell housing. Usually, two voltage taps, such as a positive voltage tap and a negative voltage tap in particular, are arranged on an upper side surface, referred to as the top surface. The lower side surface arranged opposite the upper side surface is referred to as the bottom surface.

In the case of arrangement of the battery cells next to one another in a longitudinal direction of the battery module, the battery cells are arranged adjacent to one another by way of their respectively largest side surfaces, which are each arranged in particular a right angle to the upper side surface and the lower side surface. At this point, it should be noted that the longitudinal direction of the battery module is accordingly arranged perpendicularly to the largest side surfaces of the battery cells in this case.

At this point, it should be noted that, in order to form a cohesive connection formed in an adhesively bonded manner between the bottom surface of the housing of the battery module and the bottom surface of the battery cells by means of an adhesive, either preferably initially the adhesive can be dispensed into the housing of the battery module or onto the bottom surface of the housing of the battery module and/or the adhesive can also be dispensed onto the respective battery cell. Here, the cohesive connection formed in an adhesively bonded manner serves firstly to improve the conduction of heat between the bottom surface of the battery cell and the bottom surface of the housing and secondly for mechanical load transfer.

Furthermore, it should be noted that positioning comprises in principle in particular displacement and/or twisting of the plurality of battery cells on the adhesive or the bottom surface of the housing.

It is expedient when a compressing element is arranged in the longitudinal direction of the battery module between the housing and the plurality of battery cells. Here, the compressing element tapers perpendicularly to the longitudinal direction of the battery module in the direction of the bottom surface of the housing. In particular, it is also expedient here when the compressing element has two contact surfaces. Here, a first of the two contact surfaces is arranged, in particular, so as to make mechanical contact with the housing of the battery module, and a second of the two contact surfaces is arranged here, in particular, so as to make mechanical contact with a battery cell, arranged at an end, of the plurality of battery cells or an end plate described further below. Here, the two contact surfaces are arranged at an angle of at least four degrees with respect to one another. Here, the contact surfaces are furthermore designed, in particular, with such dimensions that thermal decoupling between the housing and the plurality of battery cells is ensured. In particular, the contact surfaces should be designed here with such a size that, at the beginning of the service life, reliable contact and positioning of the plurality of battery cells in the housing of the battery module are achieved until the thermally conductive adhesive cures, and that swelling forces, which are produced at the end of the service life, of the plurality of battery cells can be reliably transferred to the housing of the battery module, without the compressing element itself being mechanically damaged. Furthermore, the compressing element serves to compensate for both tolerances of the housing and of the plurality of battery cells. In order to ensure this, the compressing element is inserted in the vertical direction of the battery module in the direction of the bottom surface of the housing of the battery module, in particular until defined compression of the plurality of battery cells is formed. In particular, the compressing element serves, inter alia, also to orient or to position the plurality of battery cells and also to hold them in the desired position over the service life thereof.

It is advantageous when the compressing element is received in a form-fitting manner in a receptacle of the housing of the battery module. As a result, reliable fastening of the compressing element can be formed. In particular, the receptacle forms an angle of at least four degrees with respect to a vertical direction of the battery module arranged perpendicularly to the longitudinal direction. As a result, the process of receiving the compressing element can be simplified. At this point, it should be noted that the receptacle forms a further contact surface on which, in particular, the first of the two contact surfaces of the compressing element is arranged so as to make mechanical contact. In particular, even this contact surface forms the angle of at least four degrees with respect to the vertical direction of the battery module arranged perpendicularly to the longitudinal direction. The compressing element is particularly preferably arranged so as to make linear contact with the housing or the receptacle of the housing. The receptacle can in this case be configured for example as a guide groove. As a result, preferably a minimum contact surface can preferably be formed overall, with the result that the compressing element can be introduced with a relatively low force. In particular, the compressing element could for example even be arranged solely by way of gravity.

At this point, it should be noted that the housing of the battery module is preferably designed in the form of a die-cast component, for example from a metal material.

According to a preferred embodiment of the invention, a supporting element is arranged opposite the compressing element in the longitudinal direction of the battery module. Here, the supporting element is arranged between the housing of the battery module and the plurality of battery cells. In particular, the supporting element is arranged between the housing and a battery cell, arranged at an end, of the plurality of battery cells or an end plate, yet to be described below.

The supporting element preferably has an opening and contact surfaces. In particular, the supporting element has first contact surfaces, which are formed to make mechanical contact with the housing of the battery module, and second contact surfaces, which are formed to make mechanical contact with a battery cell, arranged at an end, of the plurality of battery cells or an end plate yet to be described below. Owing to the design with an opening, comparably small contact surfaces can be formed for establishing mechanical contact between the battery cell arranged at an end or the end plate yet to be described and the housing, as a result of which thermal decoupling is ensured. In particular, the contact surfaces should be designed with such a size that, at the beginning of the service life, reliable contact and positioning of the plurality of battery cells in the housing of the battery module are achieved until the thermally conductive adhesive cures, and that swelling forces, which are produced at the end of the service life, of the plurality of battery cells can be reliably transferred to the housing of the battery module, without the compressing element itself being mechanically damaged. The supporting element is particularly preferably formed from a polymeric material, such as in the form of a plastic injection-molded part for example.

At this point, it should additionally be noted that the supporting element is designed in such a way that tolerances between the housing of the battery module and the plurality of battery cells can be reliably compensated for.

It is particularly expedient when two compressing elements are arranged. Here, the two compressing elements are arranged at the same end of the plurality of battery cells. This offers the particular advantage that even better compensation is possible, wherein the two compressing elements can be reliably arranged in particular independently of one another and in each case autonomously. For example, the two compressing elements can be inserted to different extents. In addition, swelling forces, which are produced as a result, of the battery cells can be uniformly transferred to the housing of the battery module via the two compressing elements, as a result of which reaction forces which are produced in different ways on one side can be avoided.

Furthermore, it is also expedient when the housing of the battery module comprises a temperature-control element directly adjacent to the bottom surface of the battery cells. In particular, this temperature-control element is in the form of a temperature-control chamber through which temperature-control fluid can flow. For example, the housing of the battery module can have an integrated temperature-control chamber for this purpose. In a preferred embodiment, the plurality of battery cells is thermally conductively connected to the bottom surface of the housing in particular by means of a thermally conductive adhesive, as a result of which heat can be transferred from the bottom surface of the respective battery cell to the temperature-control element. The thermally conductive adhesive therefore serves to establish thermal contact between the temperature-control element and the plurality of battery cells.

The plurality of battery cells are preferably arranged between two end plates. At this point, it should be noted that the battery cells arranged opposite in the longitudinal direction of the battery module and at an end are respectively arranged adjacent to one of the two end plates. The two end plates are braced with one another by means of at least one clamping element. In particular, the clamping element is in the form of a clamping band. Here, the at least one clamping element is preferably cohesively connected to the end plates. For example, this connection can preferably be formed in a welded manner. The battery module particularly preferably comprises two clamping elements which are each preferably in the form of a clamping band and/or which are arranged opposite one another on the plurality of battery cells, wherein a first end of the respective clamping element is respectively connected to a first of the two end plates and a second end of the respective clamping element is respectively connected to a second of the two end plates. Here, these connections are preferably formed in a cohesive manner, such as in particular in a welded manner. A cohesive connection between the at least one clamping element and the end plates can advantageously transfer comparably high forces. At this point, it should be noted that a comparably low initial pre-stressing force can be formed by the compressing element owing to the pre-stressing or pre-pressing of the plurality of battery cells formed by means of the clamping element at the beginning of the service life.

An adhesive is particularly preferably arranged between a side surface of a battery cell and the clamping element. Here, the adhesive can furthermore have thermally conductive additives. Therefore, a situation where the adhesive is in the form of a thermally conductive adhesive is particularly preferred. In particular, said adhesive can be selected to be the same adhesive as that which forms a cohesive connection between the bottom surface of the housing of the battery module and the bottom surface of the battery cell. At this point, it should be noted that here the side surface of the battery cell is in each case arranged perpendicularly to the largest side surfaces of the battery cell. For production purposes, here, the adhesive can initially be applied either to the respective side surface of the battery cell or else to the clamping element. The connection formed in an adhesively bonded manner between a side surface of a battery cell and the clamping element advantageously forms a secondary mechanical load path, as a result of which, overall, the adhesive connection between the bottom surface of the housing of the battery module and the bottom surface of a battery cell is subject to lower loads during operation of the battery module.

The supporting element is advantageously connected in a form-fitting or cohesive manner to an end plate or to the housing. This allows comparably simple production of the battery module.

The compressing element and/or the supporting element are/is particularly preferably formed from a polymeric material, such as in the form of a plastic injection-molded part for example.

A respective spacer element is preferably arranged between two battery cells arranged adjacent to one another. In particular, the spacer element of this kind is accordingly arranged adjacent to the respectively largest side surfaces of the battery cells, between which the spacer element is arranged. Spacer elements of this kind can in particular prevent direct contact between the battery cells respectively arranged adjacent to one another and therefore form a defined spacing between the battery cells of this kind. As a result, thermal insulation and/or electrical insulation can be formed.

Overall, an embodiment according to the invention of the battery module offers the advantage that the compressing element, in particular its two contact surfaces, makes/make mechanical contact with the housing and the plurality of battery cells or the respective end plate and that, opposite to this, the supporting element, in particular its two contact surfaces, makes/make mechanical contact with the housing and the plurality of battery cells or the respective end plate, as a result of which positioning and fixing of the plurality of battery cells in the housing is ensured both at the beginning of the service life (BoL for short) and at the end of the service life (EoL for short).

Via what is known as a primary mechanical load path at the bottom of the housing of the battery module, during operation, a mechanical load is transferred from the plurality of battery cells via the adhesive bond to the bottom surface of the housing of the battery module. Such a mechanical load can comprise swelling forces of the battery cells that arise, in particular during operation, both at the beginning of the service life and at the end of the service life. The forces are in this case greatest at the battery cells arranged at the ends.

Via what is known as a secondary mechanical load path, during operation, a mechanical load is transferred from the plurality of battery cells via the adhesive bond to the clamping element. Such a mechanical load can also comprise swelling forces of the battery cells that arise, in particular during operation, both at the beginning of the service life and the end of the service life. The forces are in this case greatest at the battery cells arranged at the ends.

In particular, the compressing element and the supporting element exert comparably lower pre-stressing forces on the plurality of battery cells at the beginning of the service life. During operation of the battery module, the swelling forces of the battery cells increase comparably sharply from the beginning of the service life to the end of the service life and thus stress the primary mechanical load path and the secondary mechanical load path to a greater extent than at the beginning of the service life. In particular, the stresses within the cohesive connection between the battery cells arranged at an end and the housing increase comparably sharply. In order to reduce and thereby to limit stresses occurring within the cohesive connection, such as in particular within the connection formed in an adhesively bonded manner, between the bottom surface of the housing of the battery module and the bottom surface of the battery cells and also between the clamping element and the side surfaces of the battery cells, the compressing element and the supporting element are supported on the housing. As a result, overall, the mechanical load within the cohesive connection is reduced, in particular at the end of the service life, and failure of said cohesive connection is prevented, as a result of which the reliability of the battery module can be increased overall. In addition, the risk of adequate temperature control of the battery cells no longer being provided on account of failure of the cohesive connection can preferably be considerably reduced. Furthermore, as a result, the properties of the adhesive, such as its strength up to elongation at break for example, can be selected in a comparably larger range as a result. For example, a thermally conductive adhesive with relatively low strength values and better thermal conductivity could be selected.

In particular, the compressing element is arranged so as to make mechanical contact with the housing in such a way that a spacing is always formed between the housing and the end plate or the battery cell at an end. As a result, an air gap with a thermally insulating action is formed.

In particular, the compressing element and/or the supporting element exert such a force on the plurality of battery cells such that, in principle, a change in position of the battery cells during the production of the battery module is reliably prevented before the adhesive has cured. Furthermore, as a result, the curing of the adhesive could also take place at a desired later time during the production of the battery module.

It should further also be noted that both the compressing element and the supporting element could also be formed from a metal material, as a result of which even higher forces would be able to be transferred in particular. In this case, thermal insulation and/or electrical insulation should be provided in order to thermally and/or electrically insulate the plurality of battery cells from the housing of the battery module.

The present invention also relates to a battery module which has been produced using a method according to the invention that has just been described.

It is expedient when, for positioning, the plurality of battery cells braced with one another are pushed, in particular together with the spacer elements arranged between adjacent battery cells, the two end plates and the at least one clamping element as an entire unit, on the bottom surface of the housing or the adhesive in the direction of the supporting element until said supporting element makes contact with the housing and also before, for example, the thermally conductive adhesive cures. In other words, said elements or the entire unit are/is displaced on the adhesive. The compressing element is then inserted into the battery module until defined compression is formed. In particular, in this case, the compressing element can already be pre-fixed to the cell stack or else fixed only after the compressing element has been finally inserted. Owing to the arrangement of the compressing element, tolerances in the arrangement of the plurality of battery cells and/or the housing can be compensated for in this case.

BRIEF DESCRIPTION OF THE DRAWINGS

Exemplary embodiments of the invention are illustrated in the drawings and described in greater detail in the following description.

In the drawings.

DETAILED DESCRIPTION

Figure 1:
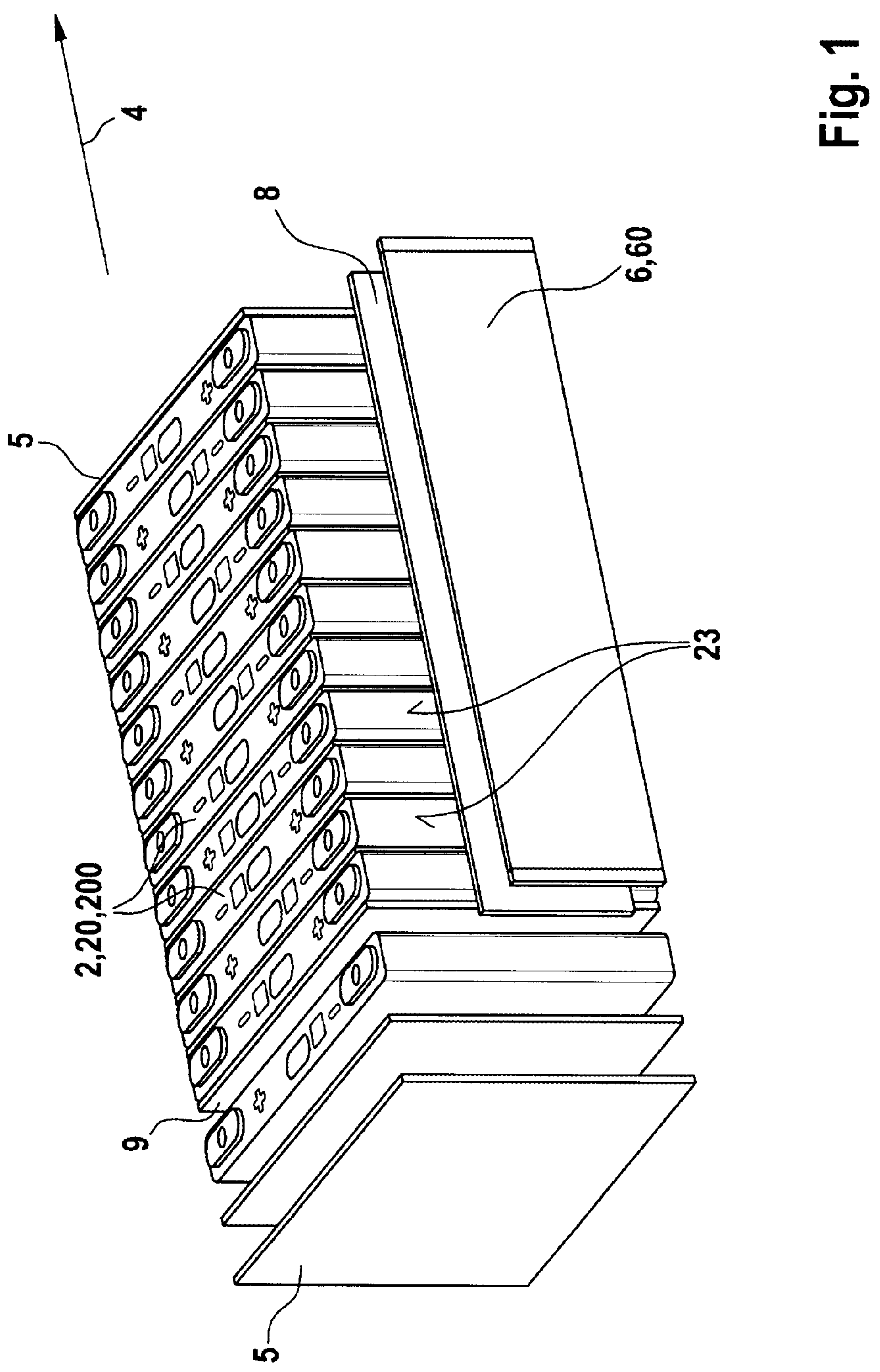
FIG. 1 shows an exploded illustration of a plurality of battery cells braced with one another.

FIG. 1 shows an exploded illustration of a plurality of battery cells 2 braced with one another, which are each in the form of prismatic battery cells 20. In particular, the battery cells 2 are preferably in the form of lithium-ion battery cells 200.

Figure 2:
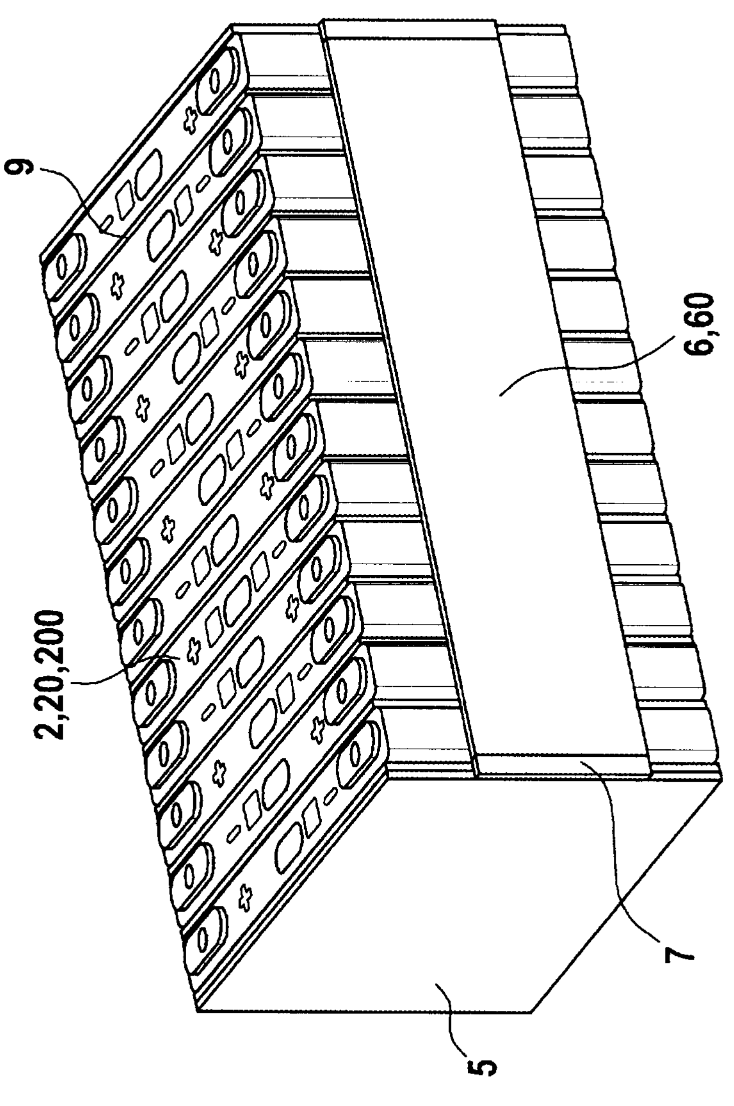
FIG. 2 shows a perspective view of the plurality of battery cells braced with one another in accordance with FIG. 1.

FIG. 2 shows a perspective view of the plurality of battery cells 2 braced with one another in accordance with FIG. 1. Therefore, FIGS. 1 and 2 should be described together in the text which follows.

In said figures, the battery cells 2 are arranged next to one another in a longitudinal direction 4 of the battery module 1. In addition, the battery cells 2 are braced with one another.

Furthermore, said figure shows that the plurality of battery cells 2 are arranged between two end plates 5. Here, the two end plates 5 and the plurality of battery cells 2 are braced with one another by way of clamping elements 6. In particular, the clamping elements 6 are each in the form of a clamping band 60 here. In particular, FIG. 2 shows that the clamping element 6 is cohesively connected to the end plates 5, such as in particular in a welded manner by means of a welded connection 7.

An adhesive 8, which particularly preferably has thermally conductive additives, is arranged between the clamping element 6 and a side surface 23 of a battery cell 2.

In addition, a respective spacer element 9 is arranged between two battery cells 2 arranged adjacent to one another. A spacer element 9 is also arranged between an end plate 5 and a battery cell 2 arranged at an end.

Figure 3:
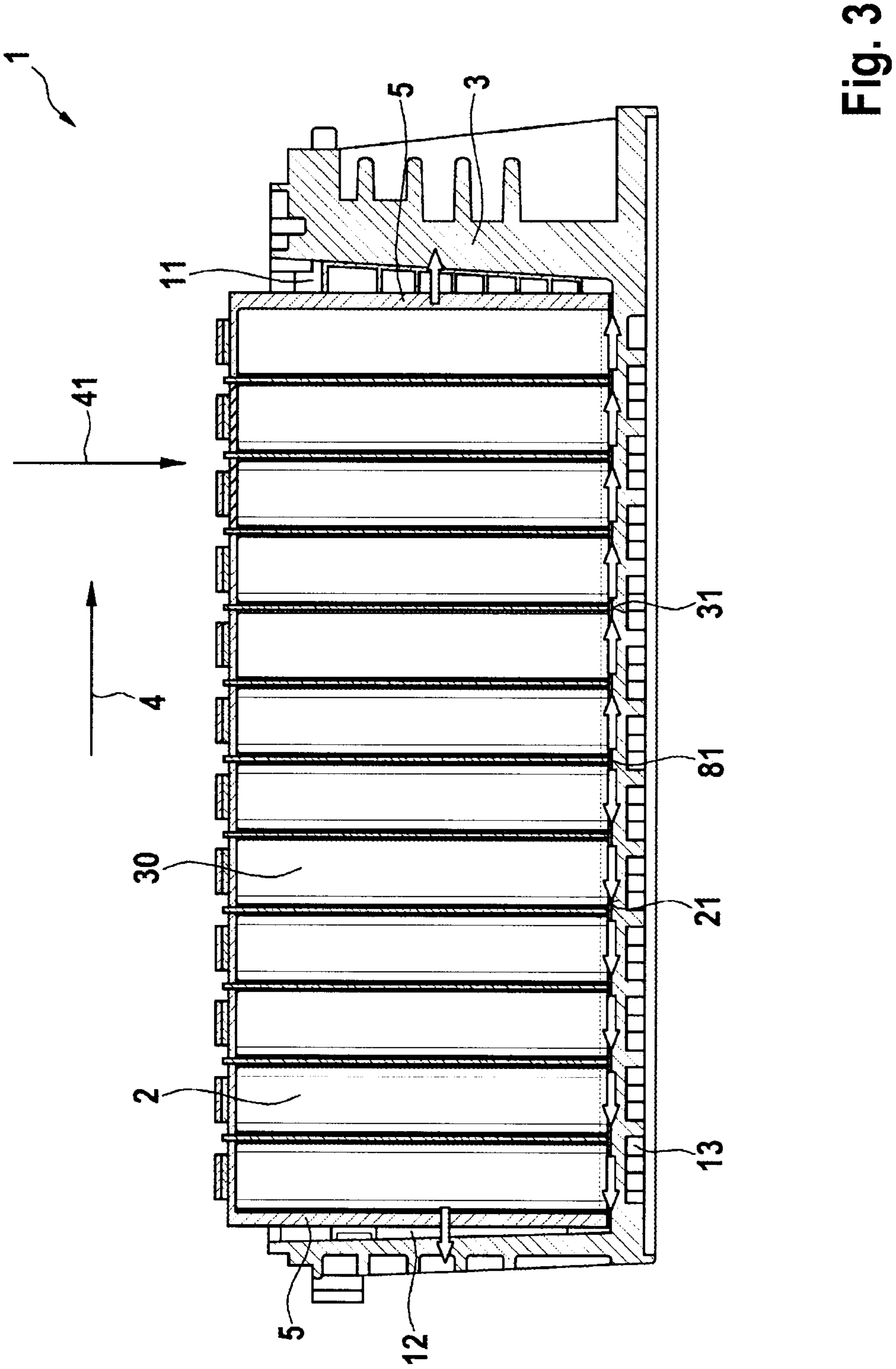
FIG. 3 shows a sectional view of an embodiment of a battery module according to the invention from the side.

FIG. 3 shows a sectional view of an embodiment of a battery module 1 according to the invention from the side.

Said figure shows that the plurality of battery cells 2 are received in an interior 30 of a housing 3 of the battery module 1.

Furthermore, a bottom surface 31 of the housing 3 of the battery module 1 and a bottom surface 21 of the battery cells 2 are respectively cohesively connected to one another. In particular, this connection can be formed by means of an adhesive 81.

Here, the housing 3 of the battery module 1 comprises a temperature-control element 13 directly adjacent to the bottom surfaces 41 of the battery cells 2.

A compressing element 11 is arranged between the housing 3 of the battery module 1 and the plurality of battery cells 2 in the longitudinal direction 4 of the battery module 1. Here, the compressing element 11 tapers perpendicularly to the longitudinal direction 4 of the battery module 1 in the direction of the bottom surface 31 of the housing 3 of the battery module 1. In particular, this taper is formed in a vertical direction 41, which is arranged perpendicularly to the longitudinal direction 4.

Furthermore, said figure shows that a supporting element 12 is arranged between the housing 3 of the battery module 1 and the plurality of battery cells 2 opposite the compressing element 11 in the longitudinal direction 4 of the battery module 1.

Furthermore, FIG. 3 shows the above-described primary mechanical load path, in the case of which, at the bottom of the housing 3 of the battery module 1, a mechanical load is transferred from the plurality of battery cells 2 via the adhesive bond to the bottom surface 31 of the housing 3 of the battery module 1 during operation. Furthermore, a force is transferred to the housing 3 of the battery module 1 via the supporting element 12 and the compressing element 11.

To produce the battery module 1, the plurality of battery cells 2 are first of all positioned. In particular, to this end, the battery cells 2 are displaced in the longitudinal direction 4 in the direction of the supporting element 12 or the left-hand housing wall until in particular the end plate 5 comes to rest on the supporting element 12 and the supporting element 12 comes to rest on the left-hand housing wall. Subsequently, the compressing element 11 is introduced in the vertical direction 41 in the direction of the bottom surface 31 of the housing 3 of the battery module until a defined compression as formed.

Figure 4:
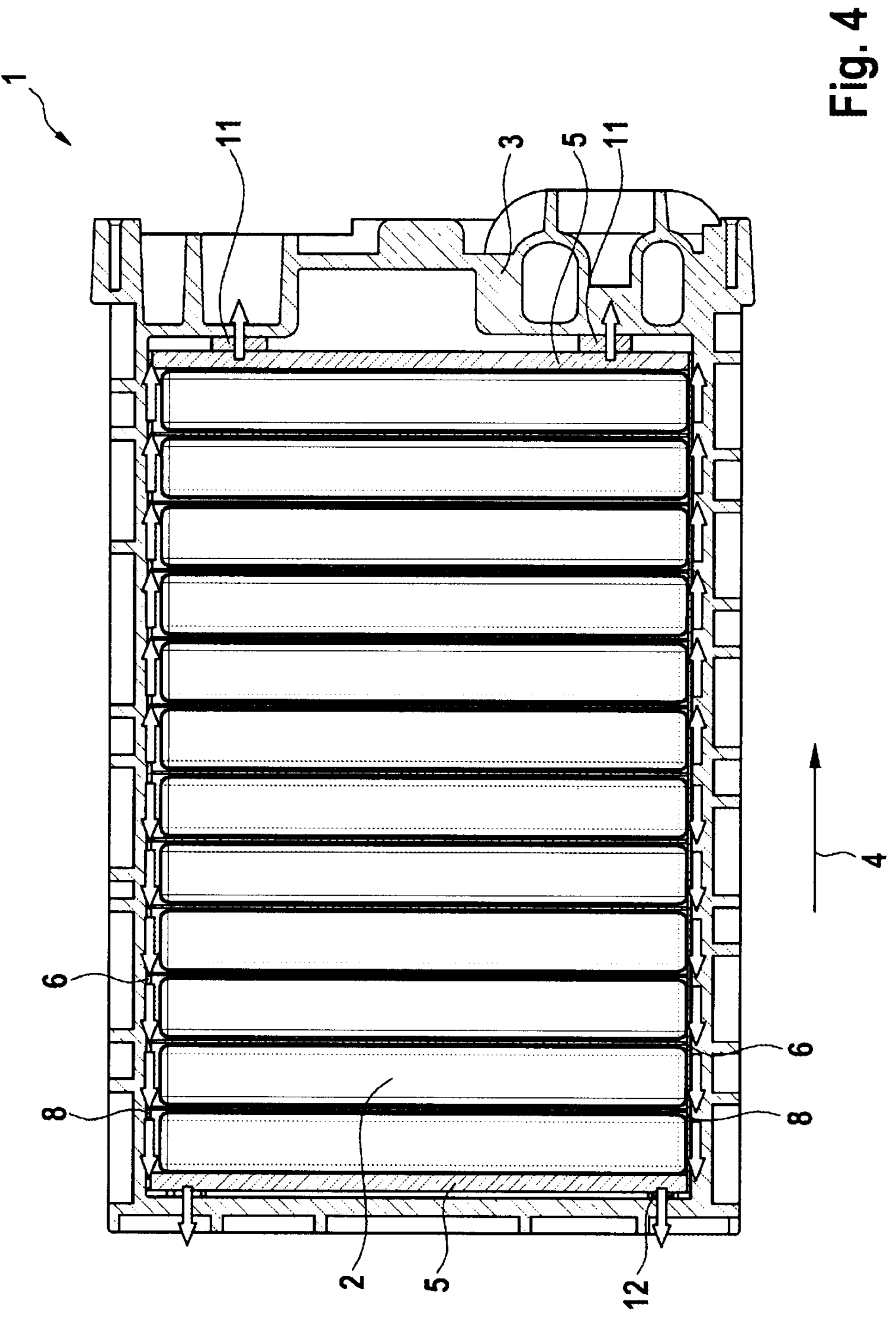
FIG. 4 shows a sectional view of the embodiment of the battery module according to the invention in accordance with FIG. 3 from above.

FIG. 4 shows a sectional view of the embodiment of the battery module 1 according to the invention in accordance with FIG. 3 from above.

It is apparent from FIG. 4 that preferably two compressing elements 11 are arranged.

Furthermore, FIG. 4 shows the above-described secondary mechanical load path, in the case of which, during operation, a mechanical load is transferred from the plurality of battery cells 2 to the clamping element 6 via the cohesive connection formed in an adhesively bonded manner. Furthermore, a force is transferred to the housing 3 of the battery module 1 via the supporting element 12 and the compressing element 11.

Figure 5:
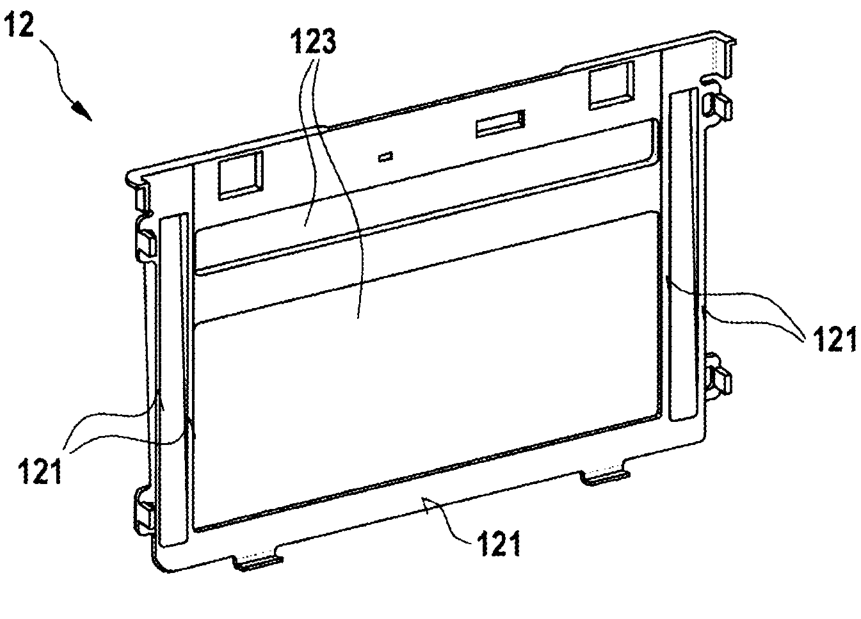
FIG. 5 shows an embodiment of a supporting element.
Figure 5:
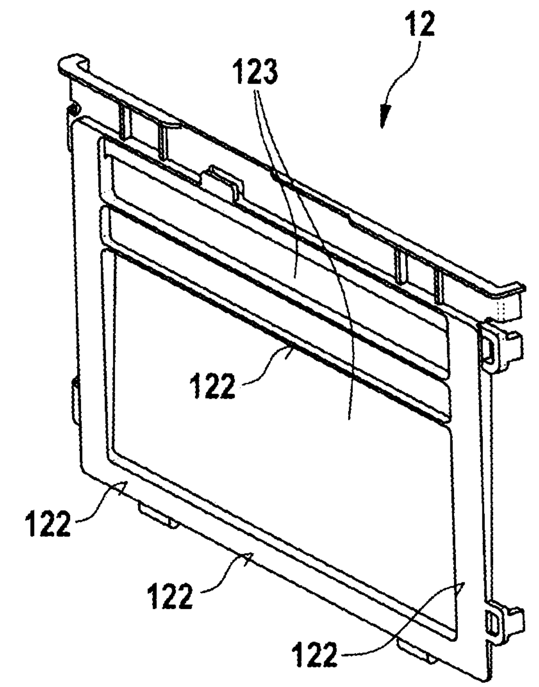

FIG. 5 shows an embodiment of a supporting element 12. The left-hand-side illustration in said figure shows a first view with contact surfaces 121, which are formed to make mechanical contact with the end plates 5. Furthermore, the right-hand-side illustration shows a second view with contact surfaces 122, which are formed to make mechanical contact with the housing 3 of the battery module 1.

Furthermore, the supporting element 12 has an opening 123. Said opening 123 serves to ensure thermal decoupling.

Such a supporting element 12 is particularly preferably formed from a polymeric material.

Figure 6:
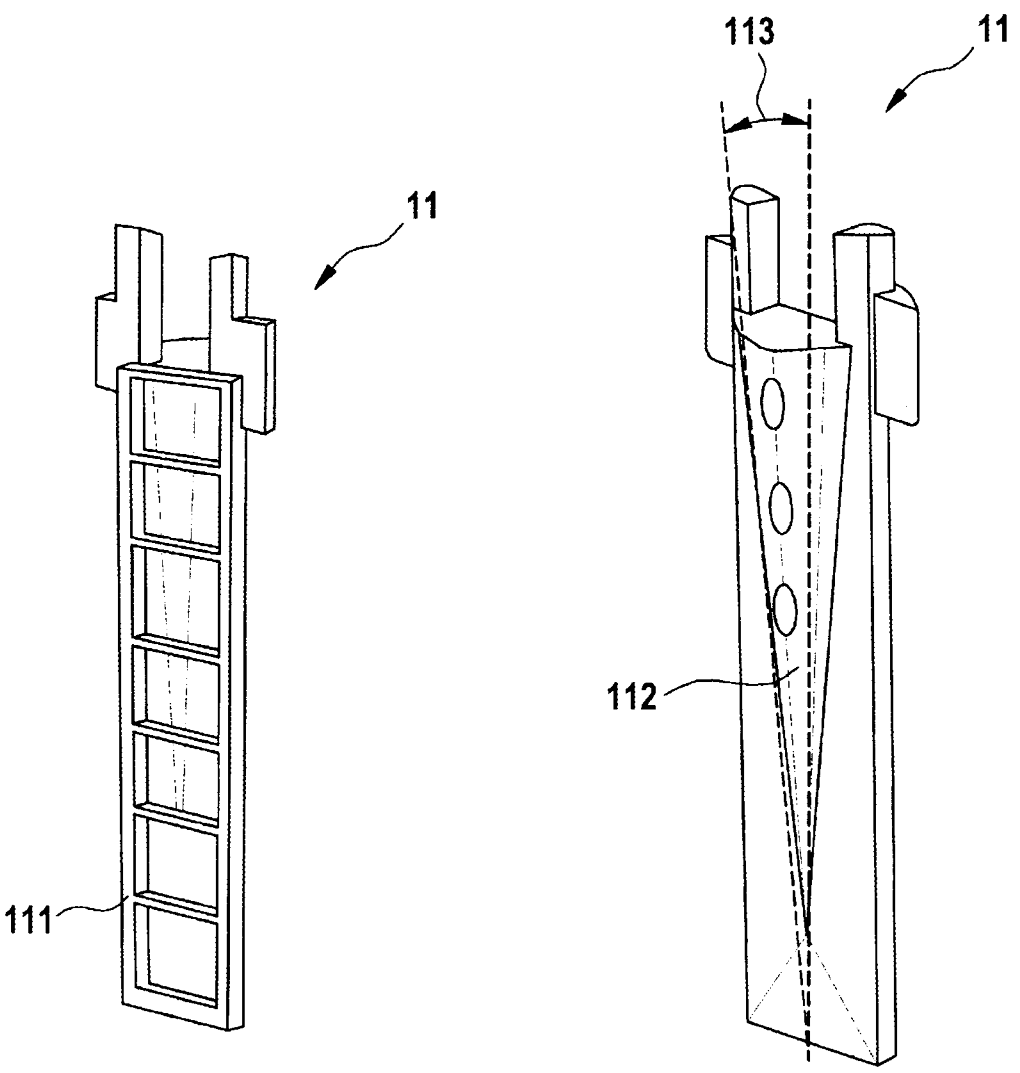
FIG. 6 shows an embodiment of a compressing element.

FIG. 6 shows an embodiment of a compressing element 11.

The left-hand-side illustration of said figure shows a first view with a first contact surface 111 which is formed to make mechanical contact with the end plates 5. Furthermore, the right-hand side illustration shows a second view with a second contact surface 112 which is formed to make mechanical contact with the housing 3 of the battery module 1. In particular, the second contact surface 112 is in the form of a linear contact here.

Said figure shows that the first contact surface 111 and the second contact surface 112 are arranged at an angle 113 with respect to one another, wherein the angle has, in particular, a value of at least four degrees.

Such a compressing element 11 is particularly preferably formed from a polymeric material.

Figure 7:
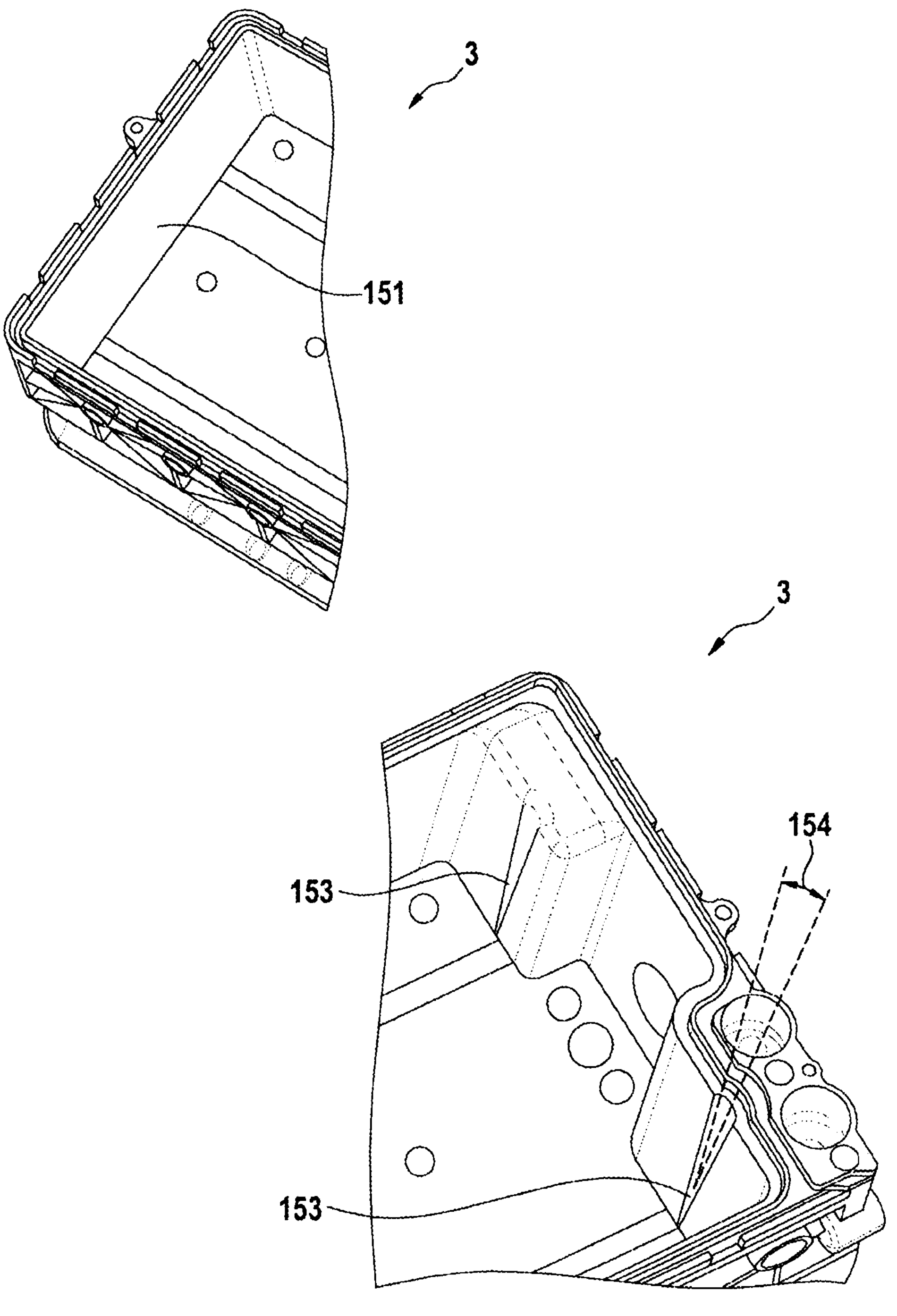
FIG. 7 shows an embodiment of a housing of the battery module.

FIG. 7 shows an embodiment of a housing 3 of the battery module 1.

The left-hand-side illustration in said figure shows the inner side 151 of the housing 3 of the battery module 1, on which inner side the supporting element 12 is arranged.

The right-hand-side illustration in said figure shows the inner side 152 of the housing 3 of the battery module 1, on which inner side the compressing element 11 is arranged or the compressing elements 11 are arranged.

Said figure shows that the housing 3 of the battery module 1 comprises receptacles 153 in which a respective compressing element 11 can be received in a form-fitting manner. In particular, the receptacles 153 in this case are in the form of guide grooves in which the linear contact of the compressing element 11 can preferably be received. That is to say, linear or in other words very narrow contact is formed between the receptacle 153 and the compressing element 11.

Furthermore, a receptacle 153 can also form an angle 154 which is formed with respect to a vertical direction 41 of the battery module 1 arranged perpendicularly to the longitudinal direction 4 of the battery module 1 and has a value of at least four degrees.

What is claimed is:

1. A method for producing a battery module having a plurality of prismatic battery cells (2, 20), which are arranged next to one another in a longitudinal direction (4) of the battery module (1), the method comprising:

positioning the plurality of prismatic battery cells (2) in an interior (30) of a housing (3) of the battery module (1), inserting two compressing elements (11) arranged on a same longitudinal end of the battery module (1) between the housing (3) and a single end-most prismatic battery cell (2) of the plurality of prismatic battery cells (2), the two compressing elements (11) being separated from one another to provide an air gap therebetween in a direction perpendicular to the longitudinal direction and therefore also creating an air gap between the housing (3) and the single end-most prismatic battery cell (2) adjacent the two compressing elements (11), the two compressing elements (11) further being independently insertable into the battery module such that the two compressing elements can be inserted to different extents, curing an adhesive, which is positioned in each case between a bottom surface (31) of the housing (3) of the battery module (1) and a bottom surface (21) of the plurality of prismatic battery cells (2), after positioning the plurality of prismatic battery cells (2, 20) in the housing (3).

2. The method according to claim 1, said compressing elements (11) tapering perpendicularly to the longitudinal direction (4) of the battery module (1) in a direction of the bottom surface (31) of the housing (3).

3. The method according to claim 2, wherein the compressing element (11) is formed from a polymeric material.

4. The method according to claim 1, wherein the two compressing elements (11) are received in a form-fitting manner in a receptacle (153) of the housing (3) of the battery module (1).

5. The method according to claim 1, further comprising arranging a supporting element (12) between the housing (3) of the battery module (1) and the plurality of prismatic battery cells (2) opposite the two compressing elements (11) in the longitudinal direction (4) of the battery module (1).

6. The method according to claim 5, wherein the supporting element (12) comprises an opening (123) and contact surfaces (121, 122).

7. The method according to claim 5, further comprising connecting the supporting element (12) in a form-fitting or cohesive manner to an end plate (5) or to the housing (3).

8. The method according to claim 5, wherein the supporting element (12) is formed from a polymeric material.

9. The method according to claim 1, wherein the housing (3) comprises a temperature-control element (13) directly adjacent to the bottom surfaces (21) of the plurality of prismatic battery cells (2).

10. The method according to claim 1, further comprising bracing the plurality of prismatic battery cells (2) between two end plates (5) by way of at least one clamping element (6).

11. The method according to claim 10, further comprising arranging an adhesive (8) between a side surface (23) of the plurality of prismatic battery cells (2) and the clamping element (6).

12. The method according claim 1, further comprising arranging a respective spacer element (9) between two battery cells of the plurality of prismatic battery cells (2) arranged adjacent to one another.

13. A method for producing a battery module having a plurality of prismatic lithium-ion battery cells (200), which are arranged next to one another in a longitudinal direction (4) of the battery module (1) and are additionally braced with one another, the method comprising:

positioning the plurality of prismatic lithium-ion battery cells (2) in an interior (30) of a housing (3) of the battery module (1), inserting two compressing elements (11) arranged on a same longitudinal end of the battery module (1) between the housing (3) and a single end-most prismatic lithium-ion battery cell (2) of the plurality of prismatic lithium-ion battery cells (2), the two compressing elements (11) being separated from one another to provide an air gap therebetween in a direction perpendicular to the longitudinal direction and therefore also creating an air gap between the housing (3) and the single end-most prismatic lithium-ion battery cell (2) adjacent the two compressing elements (11), the two compressing elements (11) further being independently insertable into the battery module such that the two compressing elements can be inserted to different extents, curing an adhesive, which is positioned in each case between a bottom surface (31) of the housing (3) of the battery module (1) and a bottom surface (21) of the prismatic lithium-ion battery cells (2), after positioning the plurality of prismatic lithium-ion battery cells (2,20) in the housing (3).

14. The method according to claim 13, said compressing elements (11) tapering perpendicularly to the longitudinal direction (4) of the battery module (1) in a direction of the bottom surface (31) of the housing (3) and having two contact surfaces (111, 112) which are arranged at an angle (113) of at least four degrees with respect to one another.

15. The method according to claim 13, wherein the two compressing elements (11) are received in a form-fitting manner in a receptacle (153) of the housing (3) of the battery module (1), wherein the receptacle (153) forms an angle (154) of at least four degrees with respect to a vertical direction (41) of the battery module (1) arranged perpendicularly to the longitudinal direction (4).

16. The method according to claim 13, further comprising arranging a supporting element (12) between the housing (3) of the battery module (1) and the plurality of prismatic lithium-ion battery cells (2) opposite the two compressing elements (11) in the longitudinal direction (4) of the battery module (1).

17. The method according to claim 16, wherein the supporting element (12) comprises an opening (123) and contact surfaces (121, 122).

18. The method according to claim 13, wherein the housing (3) comprises a temperature-control element (13) which is directly adjacent to the bottom surfaces (21) of the prismatic lithium-ion battery cells (2) and which is in the form of a temperature-control chamber through which temperature-control fluid can flow.

19. The method according to claim 13, bracing the plurality of prismatic lithium-ion battery cells (2) between two end plates (5) by way of at least one clamping band (60), wherein the at least one clamping band (60) is cohesively connected to the end plates (5) in a welded manner.

20. The method according to claim 19, further comprising arranging an adhesive (8) between a side surface (23) of a battery cell of the plurality of prismatic lithium-ion battery cells (2) and a clamping element (6), wherein the adhesive (8) furthermore has thermally conductive additives.

* * * * *